United States Patent
Johnson

(10) Patent No.: US 11,261,976 B2
(45) Date of Patent: Mar. 1, 2022

(54) FLEXIBLE BAG IN A BOX WITH HANDI-TAP CAP ASSEMBLY

(71) Applicant: Liqui-Box Corporation, Richmond, VA (US)

(72) Inventor: James W. Johnson, Delaware, OH (US)

(73) Assignee: Liqui-Box Corporation, Richmond, VA (US)

( * ) Notice: Subject to any disclaimer, the term of this patent is extended or adjusted under 35 U.S.C. 154(b) by 0 days.

(21) Appl. No.: 17/091,333

(22) Filed: Nov. 6, 2020

(65) Prior Publication Data

US 2021/0131571 A1 May 6, 2021

Related U.S. Application Data

(60) Provisional application No. 62/931,517, filed on Nov. 6, 2019.

(51) Int. Cl.
*F16K 3/26* (2006.01)
*B67D 3/00* (2006.01)

(52) U.S. Cl.
CPC .............. *F16K 3/26* (2013.01); *B67D 3/0032* (2013.01); *B67D 3/0067* (2013.01)

(58) Field of Classification Search
CPC ....... F16K 3/26; B67D 3/0032; B67D 3/0067; B65D 2401/15; B65D 47/283; B65D 25/44
See application file for complete search history.

(56) References Cited

U.S. PATENT DOCUMENTS

| | | | |
|---|---|---|---|
| 3,252,634 A * | 5/1966 | Scholle | B65D 77/067 222/514 |
| 3,430,824 A | 3/1969 | Conners et al. | |
| 3,493,146 A * | 2/1970 | Conners | B65D 47/283 222/153.06 |

(Continued)

FOREIGN PATENT DOCUMENTS

| | | |
|---|---|---|
| GB | 1016017 | 1/1966 |
| WO | 9513244 | 5/1995 |

OTHER PUBLICATIONS

Anne Marie Mohan, FIJI Water Unveils Multifaceted Plan to Reduce its Use of Plasic, Packaging World, Oct. 16, 2019, https://www.packworld.com/design/materials-containers/article/15693534/fiji-water-unveils-multifaceted-plan-to-reduce-its-use-of-plastic, 21 pages.

(Continued)

*Primary Examiner* — Vishal Pancholi
*Assistant Examiner* — Bob Zadeh
(74) *Attorney, Agent, or Firm* — McAndrews, Held & Malloy, Ltd.

(57) ABSTRACT

A valve assembly for use with a spout. The assembly includes a slide that includes a side wall, an end wall, a slide flange, and an anti-tamper strap. The side wall includes a dispensing hole. The assembly further includes a sleeve and a cap that includes an inlet, an outlet, and a cap flange. The cap flange includes a strap cavity. The cap is configured to be slidably inserted into a spout, the sleeve is configured to be slidably inserted into the cap, the slide is configured to be slidably inserted into the sleeve, and the anti-tamper strap is configured to be inserted into the strap cavity.

10 Claims, 6 Drawing Sheets

(56) References Cited

U.S. PATENT DOCUMENTS

| | | | | |
|---|---|---|---|---|
| 4,478,242 A * | 10/1984 | Bond | ................... | B65D 47/283 |
| | | | | 137/383 |
| 5,445,298 A * | 8/1995 | Strong | ................. | B65D 47/283 |
| | | | | 222/153.14 |
| 6,364,178 B1 * | 4/2002 | Paczonay | ............... | B67D 3/046 |
| | | | | 222/484 |
| 8,028,729 B2 * | 10/2011 | Kaempf | ................. | B67D 7/005 |
| | | | | 141/353 |
| 2021/0131571 A1 * | 5/2021 | Johnson | ................... | F16K 3/26 |

OTHER PUBLICATIONS

Press Release, FIJI Water Commits to 100% Recycled Plastic Bottles by 2025, Unveils New Packaging, Bevnet, Oct. 17, 2019, https://www.bevnet.com/news/2019/fiji-water-commits-to-100-recycled-plastic-bottles-by-2025-unveils-new-packaging/, 7 pages.

PCT, Notification of Transmittal of the International Search Report and the Written Opinion of the International Searching Authority, or the Declaration, Application No. PCT/US2020/059435, dated Feb. 26, 2021, 14 pages.

* cited by examiner

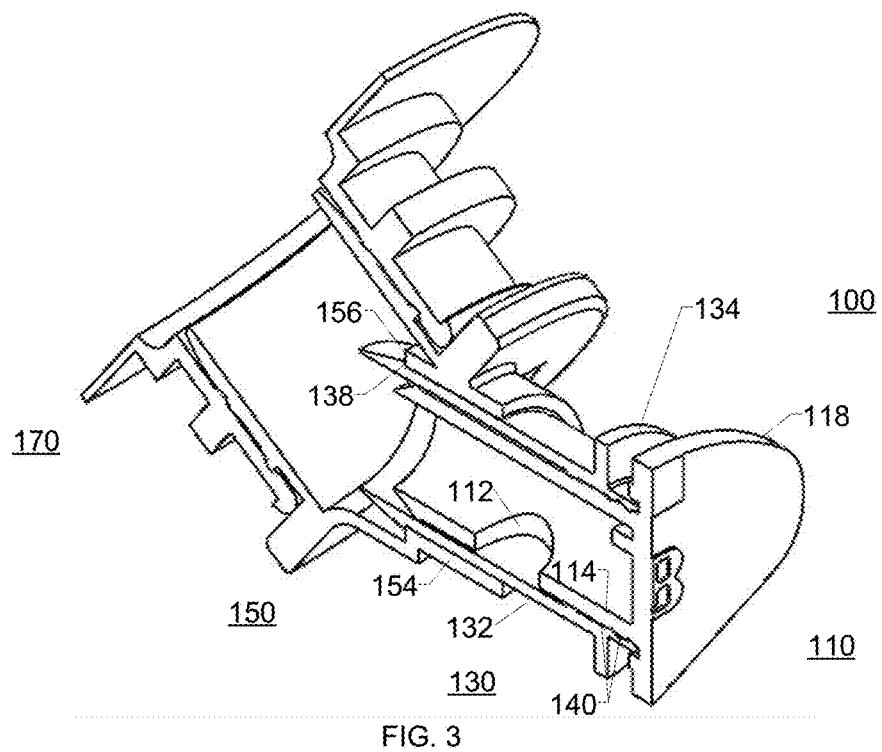
FIG. 3
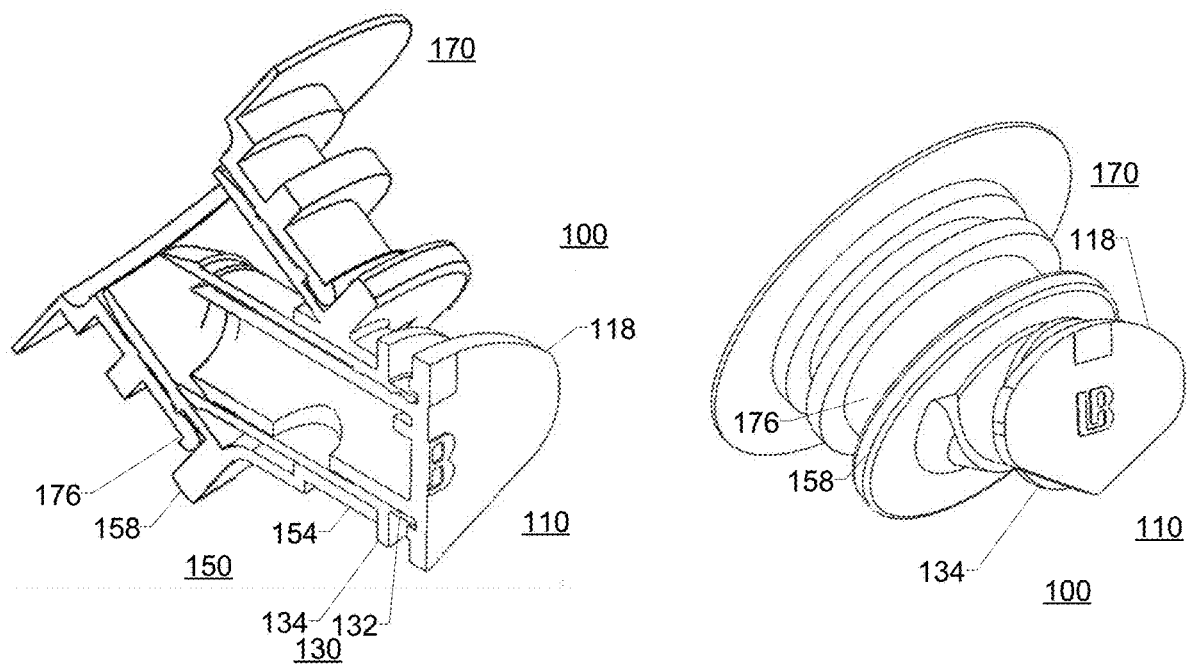
FIG. 4A
FIG. 4B

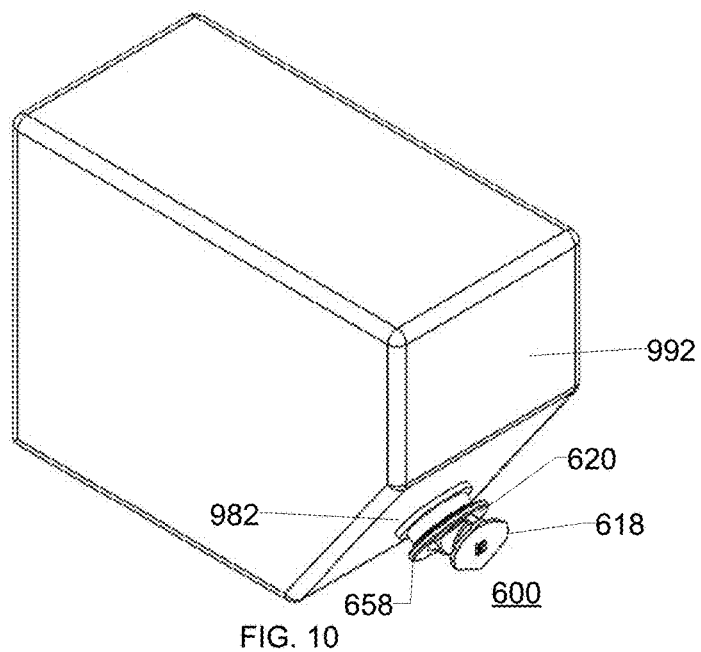
FIG. 10
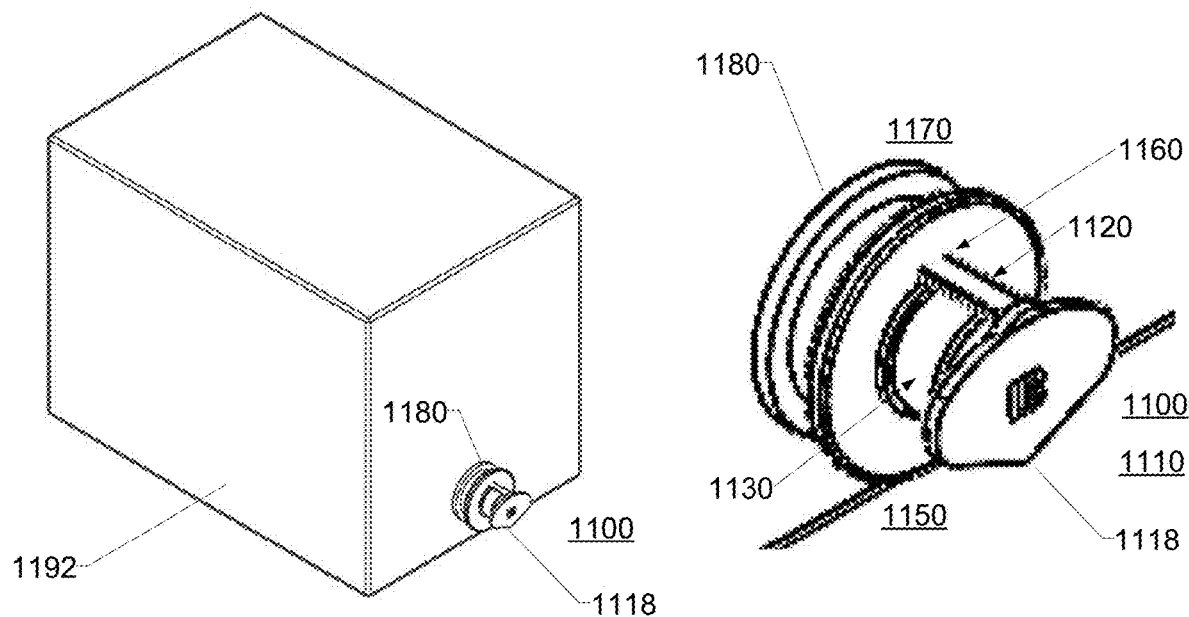
FIG. 11A
FIG. 11B

FLEXIBLE BAG IN A BOX WITH HANDI-TAP CAP ASSEMBLY

RELATED APPLICATIONS

This application is related to, and claims priority to, U.S. Provisional Application No. 62/931,517, filed Nov. 6, 2019, titled "Flexible Bag In A Box With Handi-Tap Cap Assembly," the complete subject matter and contents of which are incorporated herein by reference in their entirety.

BACKGROUND

This disclosure relates generally to liquid storage equipment and, more particularly, to container systems with pull/push valve assemblies.

Flexible, collapsible plastic containers, such as bags, are often used to store fluid products such as beverages or flowable foods, among other things. The bags may be made of plastic and housed in a box, housing, or other container to aid in the transporting, handling, and/or dispensing of the product. The plastic bags in these systems typically have sidewalls sealed along a peripheral seam to define a fluid containing interior chamber. A spout or fitment is typically connected to the bag proximate an opening in the bag and provides access to the fluid chamber for filling the bag with fluid product and dispensing fluid product from the bag. After the flexible container is filled with a desired product, the spout is closed with a cap to seal the flexible container and protect the fluid contents from contamination. The filled bag may be inserted in a box or other kind of container to make a bag-in-box product. The filled bag is then transported to the end user.

In this area of liquid storage, there is a need to cost effectively dispense liquid from the container, such as a bag in box type container, while minimizing the size of the container system before its initial use.

SUMMARY

Certain embodiments of the present technology include a valve assembly for use with a spout. The assembly includes a slide including a side wall and an anti-tamper strap, and the side wall includes a dispensing hole. The assembly includes a sleeve and a cap including and a cap flange, wherein the cap flange including a strap cavity. The cap is slidably received in the spout, the sleeve is slidably received in the cap, and the slide is slidably received in the sleeve. The spout, cap, sleeve, and slide are in fluid communication with each other, and the valve assembly is in a closed position when the sleeve is retained in a first position in the cap and the slide is retained in a first position in the sleeve such that the dispensing hole is blocked by the sleeve. The anti-tamper strap is inserted into the strap cavity when the valve is in the closed position. The valve assembly can be moved to a dispensing position when the slide is slidably moved out of the sleeve to a second position and the sleeve is slidably moved out of the cap to a second position such that the dispensing hole is unblocked by the sleeve.

The anti-tamper strap may extend from a slide flange. The anti-tamper strap and the slide flange may be molded as one component. The anti-tamper strap may further include a strap ledge, the cap flange may further includes a locking ledge, and the strap ledge may be configured to abut against the locking ledge in a locked position when the slide is fully inserted within the sleeve and the sleeve is fully inserted within the cap. The anti-tamper strap further includes a break groove.

The cap flange may further include a securing bump.

The spout may be attached to a bag in box container.

The valve assembly may be moved to the closed position by a user pushing a flange on the slide inward toward the cap such that the sleeve slides into the cap and the slide slides into the sleeve. The valve assembly may be moved to the dispensing position by pulling a flange on the sleeve to slide the sleeve out of the cap and pulling on a flange on the slide to slide the slide out of the sleeve.

The slide may include a slide retention ledge. The sleeve may include a slide stop ledge. The abutting of the slide retention ledge and the slide stop ledge may establish the fully extended slide position.

The sleeve may include a sleeve retention ledge. The cap may include a cap outlet back edge. The abutting of the sleeve retention ledge and the cap outlet back edge may establish the fully extended sleeve position.

Certain embodiments of the present technology include a method of dispensing fluid from a container through a valve assembly. The method includes the step of separating an anti-tamper strip at a break groove, wherein the anti-tamper strip includes a first end fixedly attached to a slide, a second end retained by a cap, and a break groove located between the first end and the second end. The method includes the steps of extending a sleeve from the cap and extending the slide from the sleeve such that a dispensing hole on the slide becomes unblocked by the sleeve creating a flowpath from the container, through the cap, through the sleeve, through the slide, and out the dispensing hole. The method further includes pushing the slide back into the sleeve to close the flowpath after a desired amount of fluid has been dispensed from the dispensing hole.

BRIEF DESCRIPTION OF THE DRAWINGS

FIG. 3 is a cross section view of valve assembly of FIG. 1 in a standby position.

FIG. 4A is a cross section view of the example valve assembly of FIG. 1 in the filled and unopened position.

FIG. 4B is an unsegmented perspective view of the example valve assembly of FIG. 4A.

FIG. 10 is an isometric, unsegmented view of the container system of FIG. 9.

FIG. 11A is an isometric view of a third embodiment of a valve assembly having a spout in line with the slide and sleeve installed within the cardboard box of the container system.

FIG. 11B is an enlarged view of the valve assembly of FIG. 11A.

DETAILED DESCRIPTION

In the field of liquid containers, there is a need for reducing the amount of plastic used in the storage and transportation of liquids while maintaining convenient access to the liquids at the final place of use. Although larger containers may provide some savings of materials compared to multiple smaller containers of a similar type, rigid plastic containers still require a certain amount of material to allow for stacking during transport. By using a combination of materials such as cardboard to provide the container strength and a plastic film bag to contain the liquid, significant plastic savings can be made compared to an equivalent rigid plastic only container.

This composite combination of the cardboard structure with the plastic film bag further may reduce the shipping costs of the semi-formed but unfilled containers. The existing rigid containers described above require the same space when shipped whether filled or empty. In contrast, the example container systems using film bags and cardboard structures can be shipped in a collapsed state at a small fraction of the volume, and therefore associated cost, of their filled states. This provides value in both the commercial as well as in disaster relief settings where shipping space may be limited.

Disclosed are example container systems with pull/push valve assemblies and the associated bag in box containers configured for the storage and dispensing of fluid products. The container systems include a pull/push valve assembly for isolating a liquid container having a storage position, a standby position, and an in use or dispensing position.

As used herein, the terms "first," "second," "third," etc., are used to enumerate instances of similar or identical elements, and do not indicate or imply order unless an order is specifically identified.

As used herein, the term "inner surface" refers to the portion of a given component closest to the fluid flow path and the term "outer surface" refers to the portion of a given component away from the fluid flow path.

As used herein, the term "inward" refers to the direction towards the fluid container and the term "outward" refers to the direction away from the fluid container.

Figure 1:
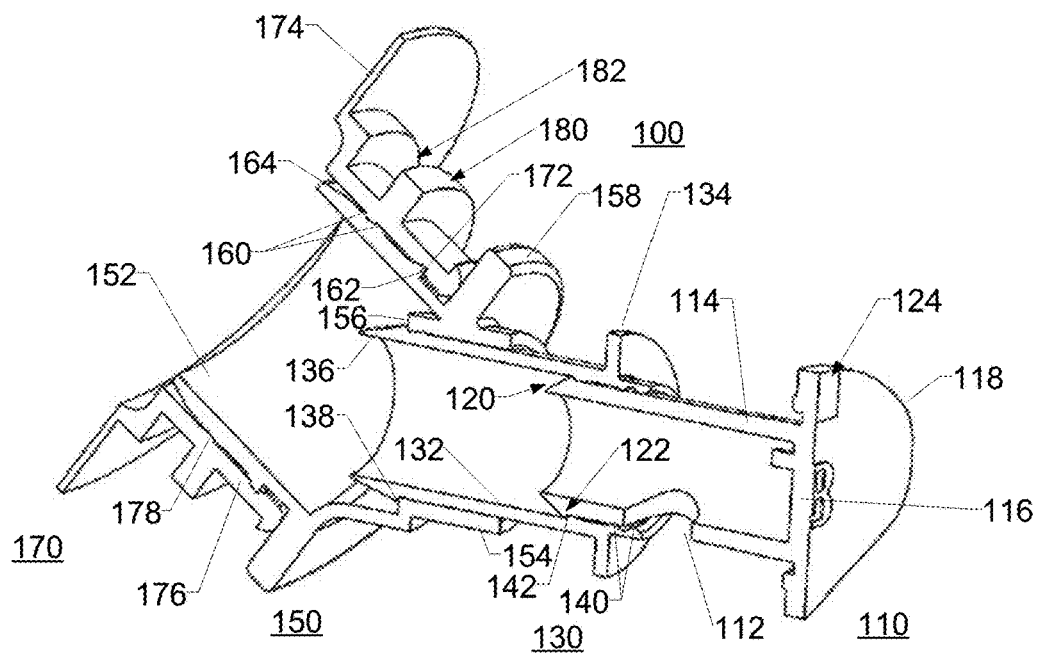
FIG. 1 is a cross section view of an example valve assembly of the container system having a slide, sleeve, and cap attached to the spout of a fluid container in the dispensing position, in accordance with aspects of this disclosure.

Turning now to the drawings, FIG. 1 is a cross section view of an example pull/push valve assembly 100 in a dispensing state. The valve assembly 100 includes a plunger or slide 110, a sleeve 130, and a cap 150. The cap 150 is configured to mate with the spout 170 of the fluid container (not shown). In this arrangement, a fluid can flow from the container, through the spout 170, the cap 150, the sleeve 130, and out of the dispensing hole 112 of the slide 110.

The slide 110 includes a side wall 114, a front wall 116, and a flange 118. The dispensing hole 112 goes through the side wall 114 providing the flow path for fluid when the slide 110 is extended from the sleeve 130. The dispensing hole 112 may be sized to provide an optimal flow rate when the slide 110 is fully extended. One end of the side wall 114 has a taper 120 which aids in inserting the slide 110 into the sleeve 130 during the initial assembly. The taper 120 ends with a retention ledge 122. The flange 118 extends from the side wall 114 in line with the front wall 116. The flange 118 provides a surface on the slide 110 for a user to pull outward as well as provides a surface for the front of the sleeve 130 to abut against when the slide 110 is fully inserted inward into the sleeve 130. Between the flange 118 and the retention ledge 122, the outer surface of the side wall 114 has a smooth surface. In some embodiments, an anti-tamper strap may be attached to an attachment point 124 on the front surface of the slide 110.

The sleeve 130 also includes a side wall 132 and a flange 134. The first end of the sleeve 130 has a taper 136 that aids in inserting the sleeve 130 into the cap 150 during the initial assembly. The taper 136 ends with a retention ledge 138. The inner surface of the side wall 132 may have one or more sealing ridges 140. The sealing ridges 140 make contact with the outer surface of the slide side wall 114 thus preventing liquid from flowing between the slide side wall 114 and the sleeve side wall 132. The inner surface of the sleeve side wall 132 also has a slide stop ledge 142. When the user pulls the slide 110 outward, the slide retention ledge 122 abuts against the slide stop ledge 142 thus preventing the slide 110 from further moving outward and maintaining a portion of the slide 110 within the sleeve 130. The sleeve flange 134 provides a surface for the front edge of the cap 150 to abut against when inserting the sleeve 130 into the cap 150. The sleeve flange 134 also provides the user a surface to grip and provide a counter force when pushing the slide 110 back into the sleeve 130. The sleeve flange 134 may also be used as a gripping surface for ensuring the sleeve is fully extended from the cap 150 during the first use.

The cap 150 provides the attachment and transition between the spout 170 of the container and the sleeve 130 and slide 110. The cap inlet 152 aligns with the spout 170 allowing the spout base 174 to be flush with the box (not shown). The cap outlet 154 is set at an angle from the cap inlet 152 allowing the sleeve 130 and plunger 110 to extend parallel to the base of the container and/or floor. This may allow the valve assembly 100 to be near or at the lowest point of the container system aiding in dispensing of the contained liquid.

The cap outlet 154 forms a surface that mates against the outer surface of the sleeve side wall 132 creating a liquid seal between the two surfaces. In other embodiments, the inner surface of the cap outlet 154 may use sealing ridges similar to the sealing ridges 140 of the sleeve 130. The back edge 156 of the cap outlet 154 abuts against the retention ledge 138 of the sleeve 130 establishing the outward extendable limit of the sleeve 130 during use.

The cap 150 also includes a flange 158 that creates the transition between the cap inlet 152 and the cap outlet 154. The flange 158 also provides a convenient location for holding the valve assembly 100 when inserting the cap 150 into the spout 170. The flange 158 further provides the surface for the end of the spout 170 to abut against when the cap 150 is fully inserted within the spout 170.

The cap inlet 152 may have one or more sealing ridges 160 to seal against the inner surface of the spout 170 and prevent liquid from leaking between those surfaces. The cap inlet 152 may also have a locking ledge 162. When the cap inlet 152 is fully inserted into the spout 170, the locking ledge 162 engages a locking groove 172 on the inner surface of the spout 170 thus preventing subsequent removal of the cap 150. Similar to the slide 110 and sleeve 130, the cap inlet 152 has a tapered leading edge 164 to aid in the insertion of the cap inlet 152 into the spout 170.

The spout 170 is configured to be attached to the film bag of the container on the film attachment flange 174. The bag may be attached to the front or back surface of the attachment flange 174. The spout wall 176 extends from the attachment flange 174 and is configured to receive the cap inlet 152. The inner surface of the spout wall 176 includes the locking groove 172 and may include one or more sealing ridges 178 to further minimize leakage between the cap 150 and the spout 170.

The outer surface of the spout wall 176 includes a cardboard contacting flange 180. The flange 180, the spout wall 176, and the attachment flange 174 create a channel 182. The channel allows the spout 170 to fit into a corresponding cutout in the cardboard container thus providing support to the spout 170 and, therefore, the valve assembly 100 while in use. In some embodiments, the spout 170 may be shipped within the cardboard cutout. In other embodiments, the spout 170 may be inserted into the cardboard cutout just before the initial use by the end user.

Figure 2:
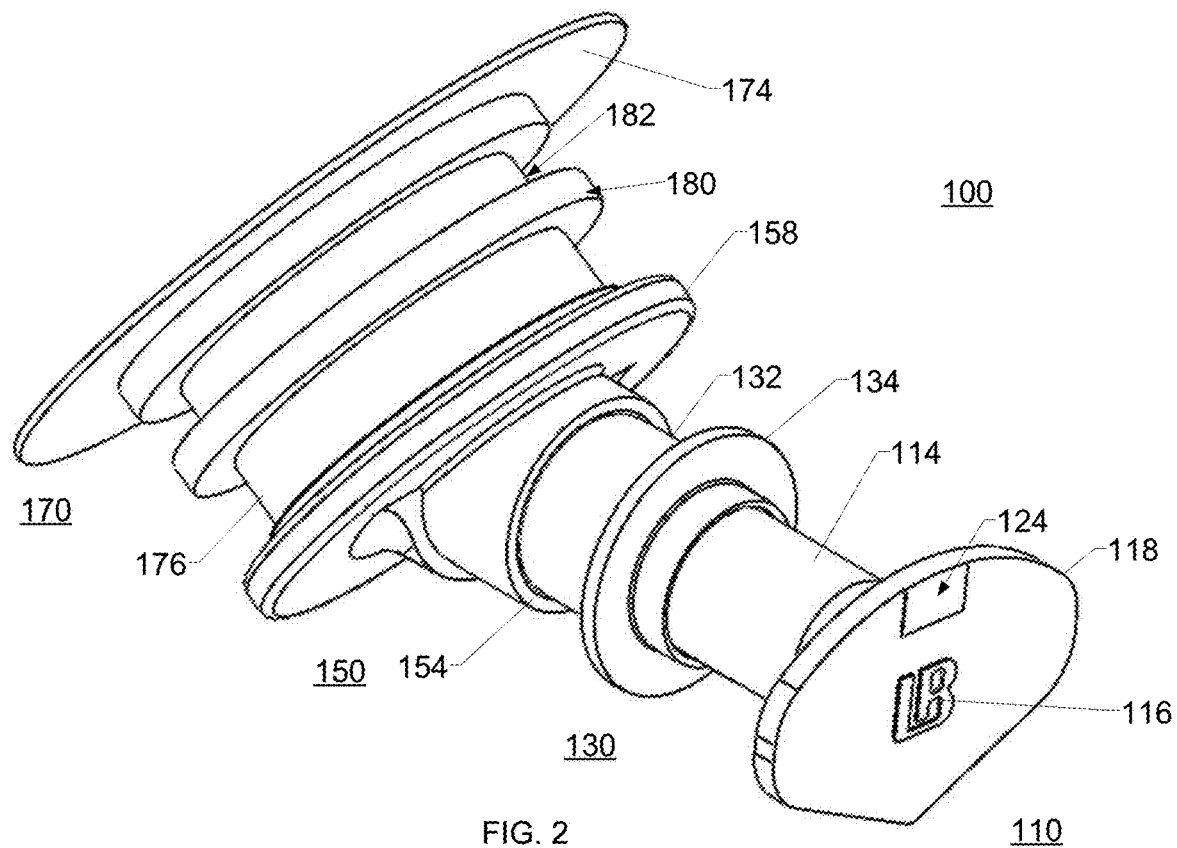
FIG. 2 is an unsegmented perspective view of the example valve assembly of FIG. 1.

FIG. 2 is a perspective view of the push/pull valve assembly 100 along with the spout 170 of FIG. 1. As in FIG. 1, the slide 110 and sleeve 130 are in an extended state that would allow the fluid from the container to flow through the spout 170 and out the slide 110.

The front wall 116, flange 118, attachment point 124, and a portion of the side wall 114 of the slide 110 are shown. In some embodiments, the brand or product information may be molded into or printed onto the front surface of the front wall 116 and flange 118. The exterior features of the sleeve 130, cap 150, and spout 170 are identified to correspond with the features in FIG. 1.

FIG. 3 is a cross section view of the valve assembly 100 in a standby position. In contrast with FIG. 1, the slide 110 has been pushed into the sleeve 130. As a result, the dispensing hole 112 is inward of the sealing ridges 140 of the sleeve 130, thus eliminating the flow path for fluid from the container, through the spout 170, and through slide 110 of the valve assembly 100. The sealing ridges 140 allow a user to move the slide 110 in and out of the sleeve 130 between the dispensing position shown in FIG. 1 to the standby position of FIG. 3 with minimal force due to the minimal contact area between the seal ridges 140 and the outer surface of the slide side wall 114. The size and shapes of the seal ridges 140 may be adjusted to compensate for different viscosities of the stored liquid as well as other considerations such as expected number of times the slide is moved out and in.

In the standby position of FIG. 3, the sleeve 130 is extended out of the cap 150 with the sleeve retention ledge 138 still against the back edge 156 of the cap outlet 154. The greater surface area between the cap outlet 154 and the sleeve side wall 132 provides greater resistance against an inward pressure by a user on the front wall 116 and flange 118 of the slide 110. Also, the sleeve flange 134 may provide a convenient location for counter pressure on the sleeve 130 by the user with respect to inward pressure applied to the slide 110 by the user. Thus, the sleeve 130 cannot be easily pushed into the cap 150.

FIG. 4A shows a cross section view of the valve assembly 100 and spout 170 with the slide 110, sleeve 130, and cap 150 each in the fully inserted position such that the valve assembly 100 and spout 170 are in the filled but closed or unopened position. FIG. 4B shows an unsegmented perspective view of FIG. 4A. As with FIG. 3, the sleeve side wall 132 abuts against the back surface of the slide's flange 118. The cap outlet 154 abuts against the sleeve flange 134. The spout wall 176 abuts against the cap flange 158. With the slide 110, sleeve 130, and cap 150 fully inserted, the size of the valve assembly 100 is minimized. This configuration is beneficial for the storage and transportation of the filled container system. In some embodiments, the valve assembly 100 may be stored within the cardboard container while not in use or while being transported creating further benefit to the minimal size of the valve assembly 100. In other embodiments, the valve assembly 100 may extend outside the cardboard container; however, the fully inserted position would similarly be useful in minimizing the space required for the valve assembly 100 in comparison with the standby position of FIG. 3.

Figure 5A:
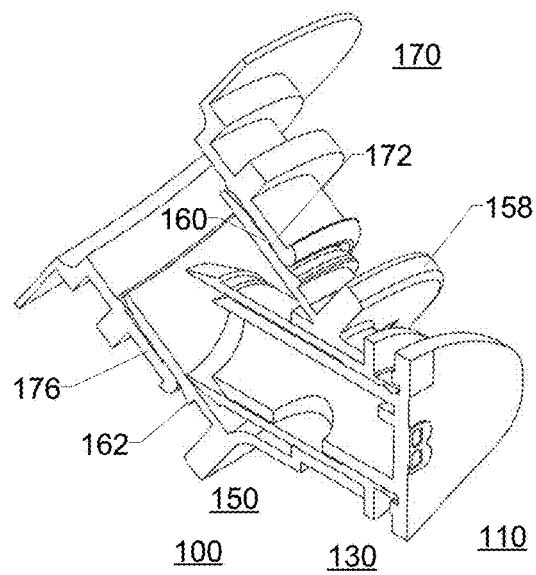
FIG. 5A is a cross section view of the example valve assembly of FIG. 1 in the unfilled and unopened position.
Figure 5B:
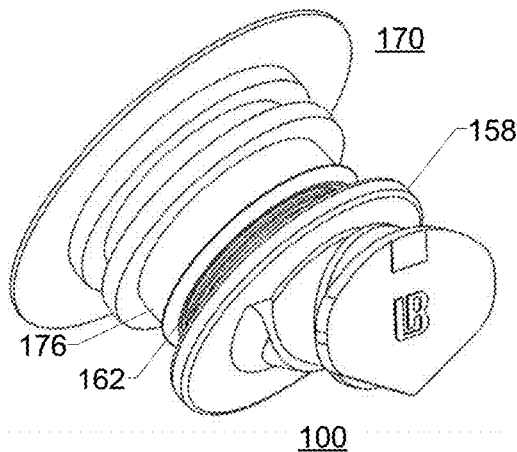
FIG. 5B is an unsegmented perspective view of the example valve assembly of FIG. 5A.

FIG. 5A shows a cross section view of the valve assembly 100 and spout 170 with the slide 110 and sleeve 130 in the fully inserted position and cap 150 partially inserted into the spout 170 as the components would be in the unfilled and unopened position. FIG. 5B shows an unsegmented perspective view of FIG. 5A. The cap flange 158 is separated from the end of the spout wall 176. The cap locking ledge 162 is outside the spout wall 176 and not engaged with the locking groove 172. In some embodiments, one of the cap sealing ridges may rest in the locking groove 172 providing a releasable connection between the cap 150 and the spout 170. This allows for transportation of the spout 170 attached to the unfilled container along with the valve assembly 100. In this position, the valve assembly 100 still prevents contamination from entering the spout 170. However, this configuration also allows for the removal of the valve assembly 100 to allow for filling of the container through the spout 170 at the filling site and the subsequent reinstallation of the valve assembly 100. After filling, the individual or machine performing the filling can fully insert the cap 150 into the spout 170, placing it in the position shown in FIGS. 4A and 4B.

Figure 6:
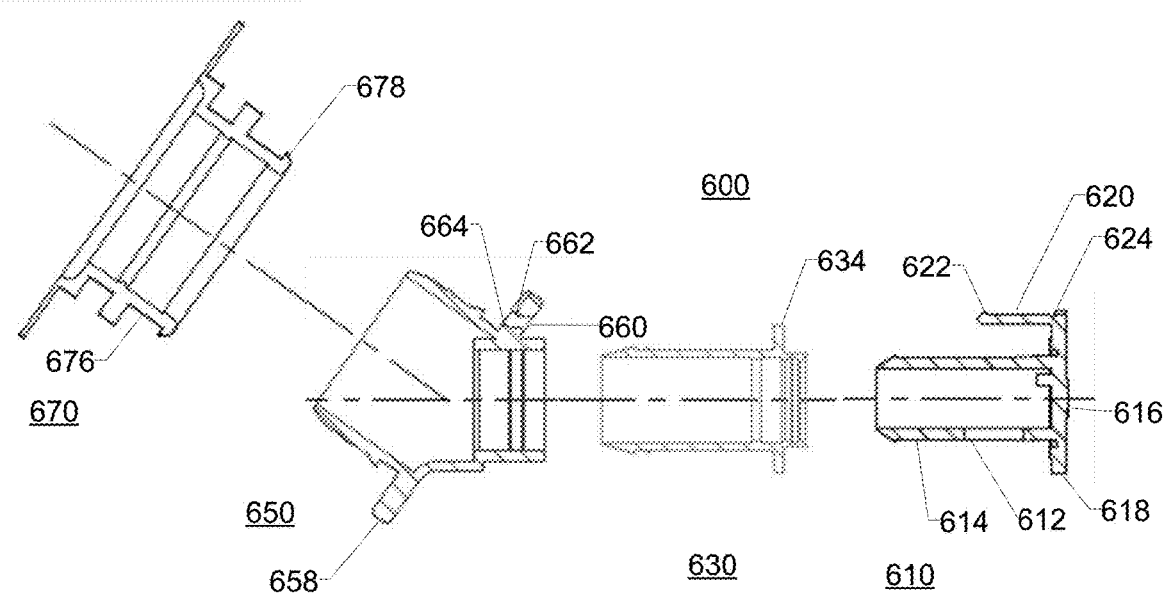
FIG. 6 is an exploded, cross-section view of a second embodiment of a valve assembly with a slide having an integrated anti-tamper strip, sleeve, and cap designed to receive the anti-tamper strip along with a spout of a fluid container.

FIG. 6 shows an exploded, cross-section view of a second embodiment of a push/pull valve assembly 600 along with a spout connector 670 of a fluid container. As with the valve assembly 100 of FIG. 1, the valve assembly 600 includes a slide 610, sleeve 630, and a cap 650.

The slide 610 may have some or all of the features of the slide 110 of FIG. 1. The slide 610 includes a dispensing hole 612 to provide a flow path for liquid out of the side wall 614. The slide 610 also includes a front wall 616 and a flange 618 similar to the first embodiment shown in FIG. 1. The slide 610 also includes an anti-tamper strap 620 extending from the backside of the flange 618 parallel to the side wall 614. The anti-tamper strap 620 may include a strap ledge 622. As seen in FIG. 6, the anti-tamper strap 620 may include a single break groove 624 located adjacent to the flange 618. In other embodiments, the anti-tamper strap 620 may have more than one break groove 624 located along the length of the anti-tamper strap 620. In yet other embodiments, a break groove may be omitted. In some embodiments, the anti-tamper strap 620 may be integrally formed with the slide 610 when the slide is molded. In other embodiments, the anti-tamper strap 620 may be molded separately from the slide 610, then subsequently attached to the slide flange 618 by sonic welding or another method of joining molded plastic components.

The sleeve 630 of FIG. 6 may have some or all of the features of the sleeve 130 of FIG. 1. In some embodiments, the sleeve 630 may be modified by either having a smaller outer diameter of the sleeve flange 634 or may have a cut out feature to the sleeve flange 634 to allow for clearance between the sleeve flange 634 and the anti-tamper strap 620. In other embodiments, the sleeve flange 634 may be identical to the sleeve flange 134 of FIG. 1.

The cap 650 of FIG. 6 may have some or all of the features of the cap 150 of FIG. 1. The cap flange 658 includes a strap cavity 660. The strap cavity 660 provides an opening through the cap flange 658 providing a location for the anti-tamper strap 620 to be inserted during assembly. The strap cavity 660 may include a locking ledge 662 and a securing bump 664.

The spout 670 of FIG. 6 may have some or all of the features of the spout 170 of FIG. 1. The spout wall 676 may end with an end flange 678.

Figure 7A:
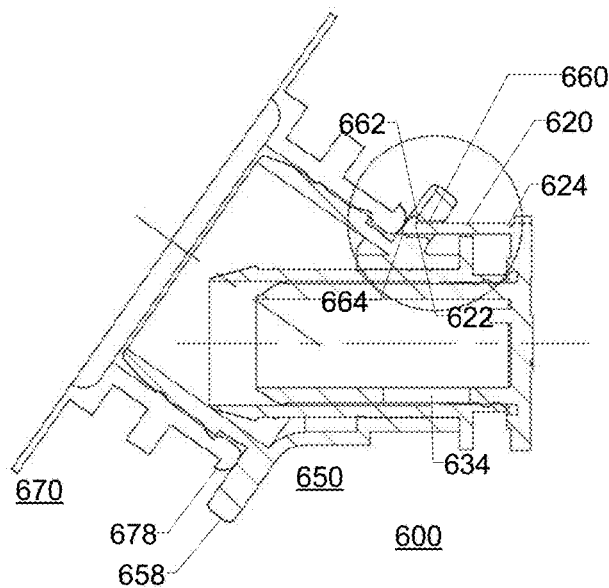
FIG. 7A is a cross-sectioned side view of the valve assembly of FIG. 6 in the filled and unopened position.
Figure 7B:
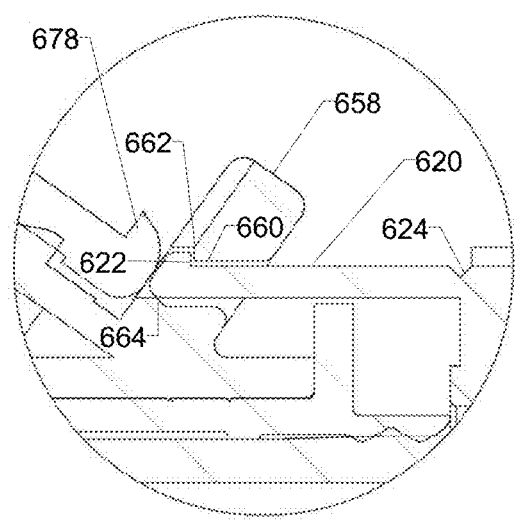
FIG. 7B is a zoomed in portion of the anti-tamper components of FIG. 7A.
Figure 7C:
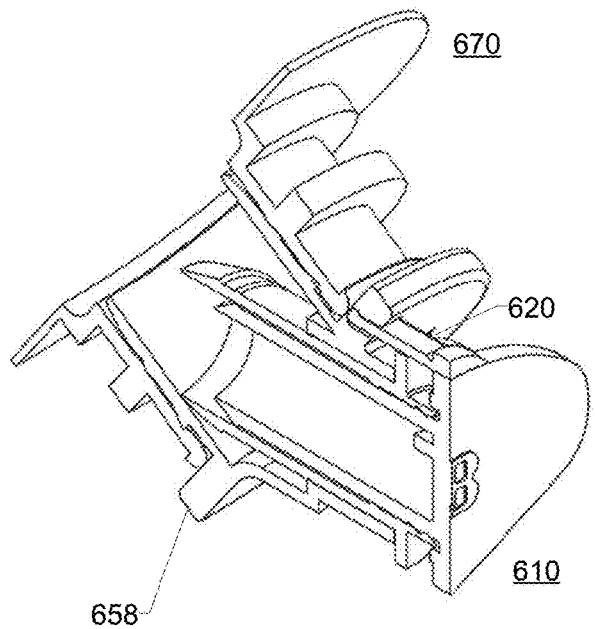
FIG. 7C is a cross-sectioned, isometric view of the valve assembly of FIG. 7A.
Figure 7D:
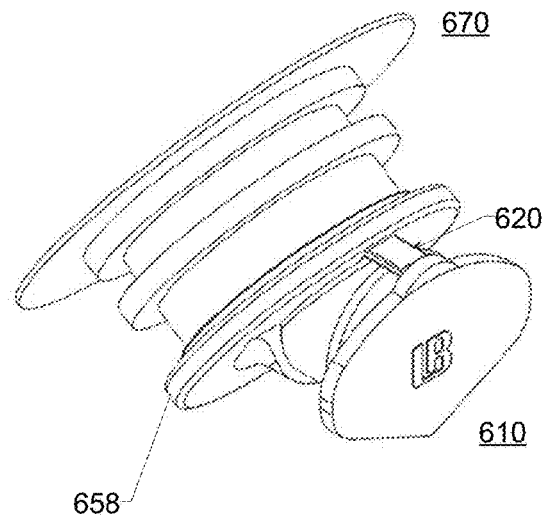
FIG. 7D is an isometric view of the valve assembly of FIG. 7A.

FIG. 7A shows a cross-sectioned, side view of the valve assembly 600 and the spout 670 of FIG. 6 in the filled and unopened position. FIG. 7B shows an enlarged portion of FIG. 7A showing the anti-tamper strap 620 and the mating area on the cap 650. FIG. 7C shows cross-sectioned, isometric view of the valve assembly 600 and the spout 670 of FIG. 6 in the filled and unopened position. FIG. 7D shows an isometric view of the valve assembly 600 and the spout 670 of FIG. 6 in the filled and unopened position. Similar to FIG. 4A, the slide 610 is fully inserted into the sleeve 630, the sleeve 630 is fully inserted into the cap 650, and the cap 650 is fully inserted into the spout 670.

During assembly of the slide 610, sleeve 630, and cap 650, the anti-tamper strap 620 of the slide 610 is inserted into the strap cavity 660 of the cap 650. As the slide 610 and sleeve 630 are fully inserted within the cap 650, the strap ledge 622 engages the locking ledge 662. The securing bump 664 may provide additional support to keep the strap ledge 622 engaged with the locking ledge 662 once fully assembled. Once the strap ledge 622 engages the locking ledge 662, the anti-tamper strap 620 prevents the slide 610 and sleeve 630 from being extended without the user separating the anti-tamper strap 620 at the break groove 624. Once the valve assembly 600 is fully inserted into the spout 670, the spout end flange 678 may extend over the strap ledge 622 and locking ledge 662. The spout end flange 678 may further prevent someone from attempting to disengage the snap fit connection between the strap ledge 622 and locking ledge 662. This forces the user to first separate the anti-tamper strap 620 in order to extend the slide 610 and/or sleeve 630 the first time, providing an indication to subsequent users whether or not the container has previously been opened.

Although the strap ledge 622 of the second embodiment is shown on the outer edge of the anti-tamper strap 620, in some embodiments, the strap ledge 622 may be on the opposite inner surface or on one or both surfaces. The location locking ledge 662 and retention bump 664 could similarly be modified to correspond with the alternate locations of the strap ledge 622.

Figure 8:
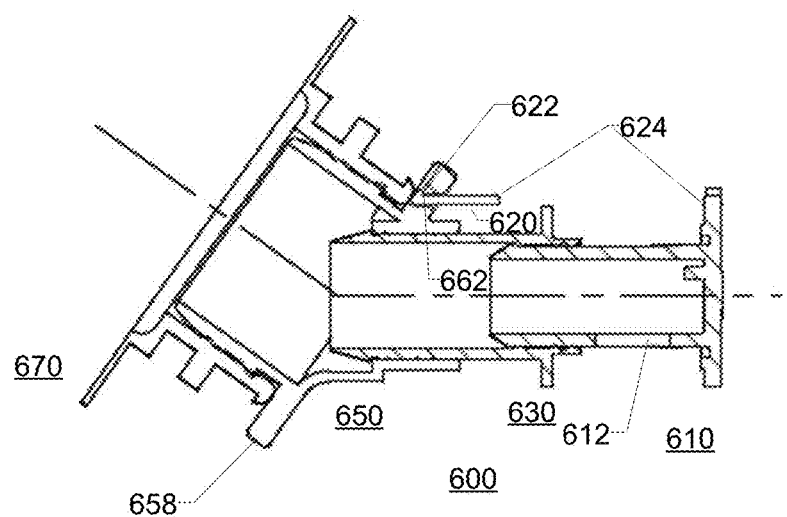
FIG. 8 is a cross-sectioned view of the valve assembly of FIG. 6 in the dispensing position after the anti-tamper strap has been broken.

FIG. 8 shows the valve assembly 600 of the second embodiment in the dispensing position after the anti-tamper strap 620 has been separated at the break groove 624. Similar to FIG. 1, the slide 610 is extended from the sleeve 630 and the sleeve 630 is extended from the cap 650. The cap 650 is still fully inserted within the spout 670. This configuration provides a flow path from the container, through the spout 670, the cap 650, the sleeve 630, the slide 610 and out the dispensing hole 612. The strap ledge 622 is still abutted against the locking ledge 662 and further held in place by the securing bump 664. A portion of the anti-tamper strap 620 thus sticks out of the cap flange 658.

Figure 9:
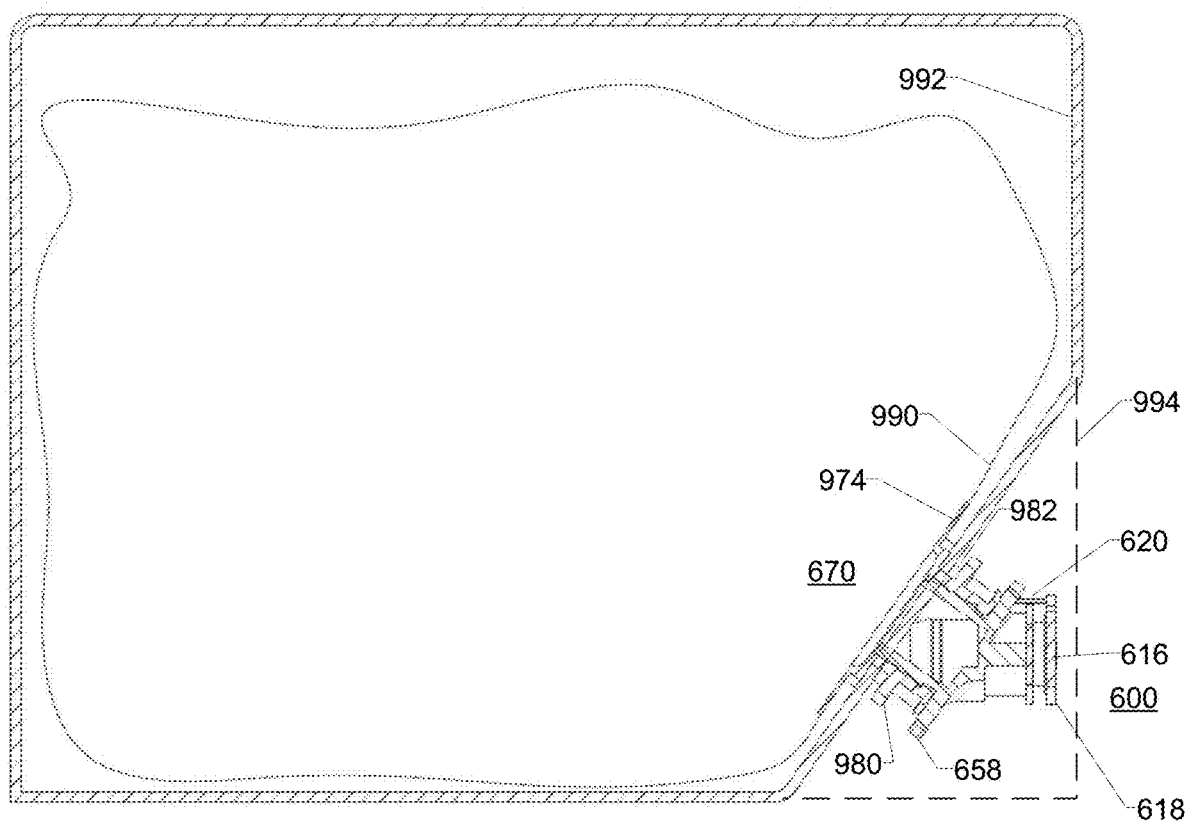
FIG. 9 is a cross-sectioned view of the valve assembly of FIG. 6 along with the corresponding film bag and cardboard box of the container system.

FIG. 9 shows a cross section view of the valve assembly 600 and spout 670 of FIG. 6 with the corresponding plastic film bag or pouch 990 and cardboard box 992. The plastic film 990 is attached to the outer surface of the attachment flange 974 of the spout 670. The cardboard box 992 supports the spout 670 by extending into the channel 982 between the flange 980 and the attachment flange 974.

The cardboard box 992 of this embodiment has a valve assembly recess 994. In the filled and unopened position as shown in FIG. 9, the front wall 616 and flange 618 of the slide 610 are behind the front edge of the cardboard box 992. Similarly, the cap flange 658 is above the bottom surface of the cardboard box 992. This configuration aids in the ability to stack filled, but unopened boxes 992.

Although FIG. 9 shows the valve assembly 600 and spout 670 of FIG. 6, the valve assembly 100 and spout 170 may be used in a similar configuration.

FIG. 10 shows an isometric view of the embodiment of FIG. 9.

FIG. 11A shows an isometric view of a third embodiment of the valve assembly 1100. FIG. 11B shows an enlarged view of the valve assembly 1100 of FIG. 11A. In contrast with the first and second embodiments, the inlet and outlet of the cap 1150 are aligned thus making the slide 1110 and sleeve 1130 in line with the spout 1170. The slide 1110 may include an anti-tamper strap 1120 which may extend from the slide flange 1118 and insert into the strap cavity 1160 of the cap 1150. In other embodiments, the anti-tamper strap 1120 and the corresponding features on the cap 1150 and slide 1110 may be omitted. The spout 1170 may use a flange 1180 to support the spout 1170 within the cardboard box 1192.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A valve assembly for use with a spout attached to bag configured to contain fluid, comprising:
    a slide including a side wall and an anti-tamper strap, the side wall further comprising a dispensing hole;
    a sleeve; and
    a cap including and a cap flange, the cap flange including a strap cavity;
    wherein the cap is slidably received in the spout, the sleeve is slidably received in the cap, and the slide is slidably received in the sleeve and the spout, cap, sleeve, and slide are in fluid communication with each other, the valve assembly being in a closed position when the sleeve is retained in a first position in the cap and the slide is retained in a first position in the sleeve such that the dispensing hole is blocked by the sleeve, the anti-tamper strap being inserted into the strap cavity when the valve is in the closed position, and wherein the valve assembly can be moved to a dispensing position when the slide is slidably moved out of the sleeve to a second position and the sleeve is slidably moved out of the cap to a second position such that the dispensing hole is unblocked by the sleeve, wherein the anti-tamper strap further includes a strap ledge, the cap flange further includes a locking ledge, and the strap ledge is configured to abut against the locking ledge in a locked position when the slide is fully inserted within the sleeve and the sleeve is fully inserted within the cap.

2. The valve assembly of claim 1, wherein the anti-tamper strap extends from a flange on the slide.

3. The valve assembly of claim 1, wherein the anti-tamper strap and the slide flange are molded as one component.

4. The valve assembly of claim 1, wherein the valve assembly is moved to the closed position by a user pushing a flange on the slide inward toward the cap such that the sleeve slides into the cap and the slide slides into the sleeve.

5. The valve assembly of claim 1, wherein the valve assembly is moved to the dispensing position by pulling a flange on the sleeve to slide the sleeve out of the cap and pulling on a flange on the slide to slide the slide out of the sleeve.

6. The valve assembly of claim 1, wherein the anti-tamper strap further comprises a break groove.

7. The valve assembly of claim 1, wherein the cap flange further comprises a securing bump.

8. The valve assembly of claim 1, wherein the spout is attached to a bag in box container.

9. The valve assembly of claim 1, wherein the slide further comprises a slide retention ledge, the sleeve further comprises a slide stop ledge, such that the slide retention ledge is configured to abut against slide stop ledge in a fully extended slide position.

10. The valve assembly of claim 1, wherein the sleeve further comprises a sleeve retention ledge, the cap further comprises a cap outlet back edge, such that the sleeve retention ledge is configured to abut against the cap outlet back edge in a fully extended sleeve position.

\* \* \* \* \*